(12) United States Patent
Reich (10) Patent No.: US 9,869,597 B1
(45) Date of Patent: Jan. 16, 2018

(54) COMPOUND STRAIN GAGE CARRIER FOR MULTI-AXIS FORCE/TORQUE SENSING

(71) Applicant: X Development LLC, Mountain View, CA (US)

(72) Inventor: Adam Reich, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/204,836

(22) Filed: Jul. 7, 2016

Related U.S. Application Data (60) Provisional application No. 62/259,381, filed on Nov. 24, 2015, provisional application No. 62/259,386, filed on Nov. 24, 2015.

(51) Int. Cl.
| | |
|---|---|
| *G01L 5/00* | (2006.01) |
| *G01L 5/22* | (2006.01) |
| *G01L 1/16* | (2006.01) |
| *B25J 13/08* | (2006.01) |

(52) U.S. Cl.
CPC ............ *G01L 5/0019* (2013.01); *B25J 13/085* (2013.01); *G01L 1/16* (2013.01); *G01L 5/226* (2013.01)

(58) Field of Classification Search
CPC ......... G01L 5/0019; G01L 5/226; G01L 1/16; B25J 13/085
USPC ...................................................... 73/862.045
See application file for complete search history.

(56) References Cited

U.S. PATENT DOCUMENTS

| | | | |
|---|---|---|---|
| 4,823,618 A | 4/1989 | Ramming | |
| 6,253,626 B1 | 7/2001 | Shoberg et al. | |
| 6,269,702 B1 * | 8/2001 | Lambson | G01L 3/108 73/862.045 |
| 6,871,552 B2 * | 3/2005 | Liu | G01L 5/161 73/862.041 |
| 7,360,456 B2 | 4/2008 | Morimoto | |
| 8,161,827 B2 | 4/2012 | Kato et al. | |
| 8,726,741 B2 | 5/2014 | Krippner et al. | |
| 8,776,616 B2 * | 7/2014 | Szasz | G01L 5/161 73/862.044 |

(Continued)

OTHER PUBLICATIONS

Capacitive F/T Transducer Model 200, Low-Cost Six Axis Force/Torque Sensor Data Sheet, ATI Industrial Automation, http://www.at-ia.com/Library/documents/Capacitive%20FT200.pdf.

(Continued)

*Primary Examiner* — Harshad R Patel
*Assistant Examiner* — Octavia Hollington
(74) *Attorney, Agent, or Firm* — McDonnell Boehnen Hulbert & Berghoff LLP (57) ABSTRACT

An example device includes a flexural element, a bendable carrier element, and a plurality of strain gages. The flexural element includes a plurality of surfaces, such as a planar surface and a perimeter surface. The bendable carrier element is shaped in order to conform to the plurality of surfaces of the flexural element when the carrier element is bent around the flexural element. The plurality of strain gages are attached to the carrier element when the carrier element is flat. Furthermore, the plurality of strain gages are positioned along the plurality of surfaces of the flexural element when the carrier element is bent around the flexural element to conform to the plurality of surfaces of the flexural element and the carrier element is attached to the flexural element.

20 Claims, 5 Drawing Sheets

(56) References Cited

U.S. PATENT DOCUMENTS

| | | | | |
|---|---|---|---|---|
| 8,943,902 | B2* | 2/2015 | Bosscher | G01L 5/226 |
| | | | | 73/862.041 |
| 8,965,577 | B2* | 2/2015 | Arimitsu | G01L 5/166 |
| | | | | 700/258 |
| 9,038,484 | B2* | 5/2015 | Seibold | G01L 5/161 |
| | | | | 73/862.045 |
| 2014/0238153 | A1 | 8/2014 | Wood et al. | |
| 2017/0211999 | A1* | 7/2017 | Bradford | G01L 5/0066 |

OTHER PUBLICATIONS

HEX-58-RE-400N 6-Axis Force Sensor Data Sheet, OptoForce, http://optoforce.com/wp-content/uploads/2014/03/HEX-58-RE-400N-DATASHEET-1.41.pdf.

HEX-70-CE-2000N 6-Axis F/T Sensor Data Sheet, OptoForce, http://optoforce.com/wp-content/uploads/2014/03/HEX-70-CE-2000N-DATASHEET-1.41.pdf.

HEX-70-CG-1000N 6-Axis F/T Sensor Data Sheet, OptoForce, http://optoforce.com/wp-content/uploads/2014/03/HEX-70-CG-1000N-DATASHEET-1.41.pdf.

HEX-70-CH-4000N 6-Axis F/T Sensor Data Sheet, OptoForce, http://optoforce.com/wp-content/uploads/2016/09/HEX-70-CH-4000N-DATASHEET-1.5.pdf.

HEX-70-XE 6-Axis F/T Sensor Data Sheet, OptoForce, http://optoforce.com/wp-content/uploads/2014/03/HEX-70-XE-DATASHEET.pdf.

HEX-70-XG 6-Axis F/T Sensor Data Sheet, OptoForce, http://pdf.directindustry.com/pdf/optoforce-ltd/hex-7-0-x-g/125451-667819.html.

FT 150 Force Torque Sensor, RobotIQ, http://robotig.com/wp-content/uploads/2014/09/Robotiq-Force-Torque-Sensor-FT-150-Specifications.pdf.

6-Axis Force / Moment Sensor FT, Schunk, https://us.schunk.com/fileadmin/pim/docs/IM0018179.PDF.

FT 300 Force Torque Sensor, RobotIQ, http://robotig.com/wp-content/uploads/2016/01/specsheet-FT300-Final-web.pdf.

Caroline Jacq, Barthelemy Luthi, Thomas Maeder, Olivier Lambercy, Roger Gassert, Peter Ryser, Thick-film multi-DOF force / torque sensor for wrist rehabilitation, Aug. 2010, Sensors and Actuators A, vol. 162, No. 2, p. 361-366, published by Elsevier.

* cited by examiner

COMPOUND STRAIN GAGE CARRIER FOR MULTI-AXIS FORCE/TORQUE SENSING

CROSS-REFERENCE TO RELATED APPLICATION

This application claims the benefit of U.S. Provisional Application No. 62/259,381, filed on Nov. 24, 2015 and U.S. Provisional Application No. 62/259,386, filed on Nov. 24, 2015, each of which is explicitly incorporated by reference herein in its entirety.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

The present application discloses implementations that relate to devices, systems, and methods that may include a flexure assembly device as part of a force/torque sensing system. Devices described herein may include a carrier element, a flexural element, and a plurality of strain gages. Other devices described herein may include a flexural element and a plurality of strain gages. Each of the flexural elements may include a plurality of surfaces such that the plurality of strain gages may be oriented to measure strain in six degrees-of-freedom. Within examples, when a load is applied to the force/torque sensing system the plurality of strain gages may measure the strain experienced from the load and then the force/torque sensing system may determine the forces and moments based on the measured strain.

In at least one embodiment, a device is disclosed. The device includes a flexural element, a bendable carrier element, and a plurality of strain gages. The flexural element includes a plurality of surfaces, such as a planar surface and a perimeter surface. The bendable carrier element is shaped in order to conform to the plurality of surfaces of the flexural element when the carrier element is bent around the flexural element. The plurality of strain gages are attached to the carrier element when the carrier element is flat. Furthermore, the plurality of strain gages are positioned along the plurality of surfaces of the flexural element when the carrier element is bent around the flexural element to conform to the plurality of surfaces of the flexural element and the carrier element is attached to the flexural element.

In another embodiment, a method is described. The method includes attaching a plurality of strain gages to a carrier element when the carrier element is flat. The carrier element is shaped to conform to a plurality of surfaces of a flexural element when the carrier element is wrapped around the flexural element. The method further includes wrapping the carrier element around the flexural element to conform the carrier element to the plurality of surfaces of the flexural element such that the plurality of strain gages are positioned along the plurality of surfaces of the flexural element. The method also includes attaching the carrier element to the flexural element such that the plurality of strain gages remain fixed along the plurality of surfaces of the flexural element.

In yet another embodiment, another device is described. The device includes a flexural element, a first plurality of strain gages and a second plurality of strain gages. The flexural element includes a planar surface and a perimeter surface, and the planar surface is perpendicular to the perimeter surface. The flexural element is configured to resist applied loads in six degrees-of-freedom. Further, the first plurality of strain gages are applied to the planar surface of the flexural element by planar screen printing. Additionally, the second plurality of strain gages are applied to the perimeter surface of the flexural element by rotary screen printing.

In yet another embodiment, a system is described. The system includes means for attaching a plurality of strain gages to a carrier element when the carrier element is flat. The carrier element is shaped to conform to a plurality of surfaces of a flexural element when the carrier element is wrapped around the flexural element. The system further includes means for wrapping the carrier element around the flexural element to conform the carrier element to the plurality of surfaces of the flexural element such that the plurality of strain gages are positioned along the plurality of surfaces of the flexural element. The system also includes means for attaching the carrier element to the flexural element such that the plurality of strain gages remain fixed along the plurality of surfaces of the flexural element.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Robotics are increasingly being applied to more widespread applications, finding uses in industrial, hospital, home and commercial environments. Force/torque sensing capabilities are a useful resource enabling implementation of various behaviors which require haptic feedback, and also for providing a safe and compelling user-experience when interfacing with people. An enabling trend in the growing ubiquity of robots is the gradual introduction of lower-cost and more human-safe technologies. Despite this, force/torque sensors available commercially remain quite costly, and consequently are not feasible for integration in very-low cost systems.

Specifically, availability of a six-axis (or six degrees-of-freedom) force/torque sensor at lower prices relative to existing technologies, may enable a wide range of applications which do justify the costs of current options. Many existing strain-gage based force-torque sensors on the market are prohibitively expensive for low-cost, high-volume applications. The design of these components may be generally geared towards very high-performance applications and the manufacturing processes are not well-suited to high-volume production. Furthermore, very small strain gages must be applied individually, and in precise position/orientation on a flexure in order to be accurate, which may be a costly endeavor. The position of gages is often in difficult-to-access locations, and after mounting, extreme care and/or expensive equipment must be used to bond and route wires between gages and circuit boards.

When a load is applied to a flexure assembly, that load will induce stress within the flexure assembly. Stress is related to strain by a material's Young's Modulus, which is a measure of stiffness of the material. As such, through this relationship of force, stress and strain, strain gages may be useful in determining forces and/or moments. Strain gages used in six degree-of-freedom force/torque sensors are typically individual, uniaxial element gages. Some strain gages may be available with multiple resistive elements on a single carrier, however these gages are generally costly, due in part to the low yield associated with manufacturing multiple gages on a single carrier during the lithography/etch process.

An example flexure assembly may be used as part of a six-axis force/torque sensor (e.g., for a commercial robotic mobile manipulator). An example flexure assembly may include a planar carrier element that may be shaped and configured to be bent in order to conform to a plurality of surfaces of a flexural element. The carrier element may be a thin metal foil or sheet and strain gages may be attached to the planar carrier element utilizing an automated process such as screen printing. The carrier element may then be wrapped around and adhered to the flexural element, positioning the strain gages along a plurality of surfaces of the flexural element, such that the strain gages may measure strain in six degrees-of-freedom.

Another example flexure assembly may not use conventional foil or silicon strain gages and may not use a separate planar carrier element, but still may be used as part of a six-axis force/torque sensor. This alternative example of a flexure assembly may use screen printing processes to develop thick-film-based piezoresistive strain gages. Within examples, strain gages may be screen printed on a plurality of surfaces of a flexural element, such as a planar surface and a perimeter surface. If strain gages were only printed on a planar surface of the flexural element, the sensitivity of the sensor may not be able to be tuned to uniformly measure in six degrees-of-freedom, and as a result the force/torque sensor as a whole may exhibit relatively poor performance in measuring forces aligned with the planar surface and moments about an axis perpendicular to the planar surface.

Utilizing a screen printing process to print strain gages to a single planar carrier element, or utilizing a combination of screen printing processes to print strain gages on a plurality of surfaces of a flexural element, may allow for lower cost development of a six degrees-of-freedom force/torque sensor while maintaining a relatively high accuracy and precision of strain measurement. Devices and processes that feature strain gages on multiple planes provide a higher sensitivity for a six degrees-of-freedom sensing system. For example, if strain gages or sensing elements were only located on a single plane of a flexural element (for example), then forces in a direction parallel to the plane along with moments normal to the plane may not be as accurately calculated because the strain gages or sensing elements may be unable to provide as sensitive of a strain measurement when compared to a device that measure strain in more than a single plane.

Example flexure assemblies described also allow strain gages to be laid out in half- or full-bridge configurations, or may provide another precise orientation of the strain gages relative to one another (e.g. orthogonal, rosette, etc.) in order to provide for better accuracy and precision in multiaxial measurements. As such, the flexure assemblies described herein are able to utilize a screen printing process (or processes) to precisely orientate strain gages on a plurality of surfaces of the flexural element such that precise strain measurements may be taken while still maintaining lower overall manufacturing costs for high-volume production.

Exemplary flexure assemblies disclosed herein may be used by robot accessory manufacturers for applications of low-cost robotic systems in unstructured or changing environments, or involving interactions with people. The design could also be employed in input devices for gaming, or in medical applications for measuring forces applied by a patient during recovery of motor skills and muscular strength following a stroke or other incident.

II. EXAMPLE ROBOTIC SYSTEMS

Figure 1:
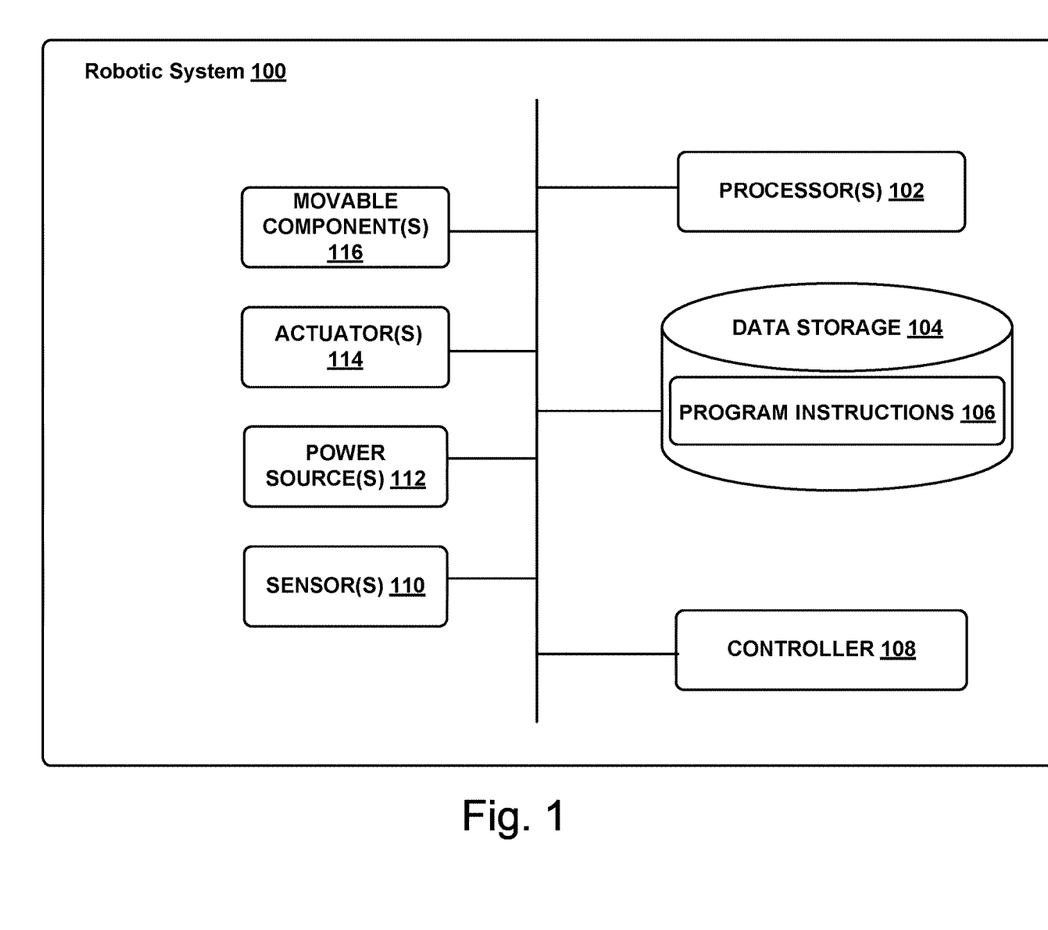
FIG. 1 illustrates an example configuration of a robotic system, according to an example embodiment.

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
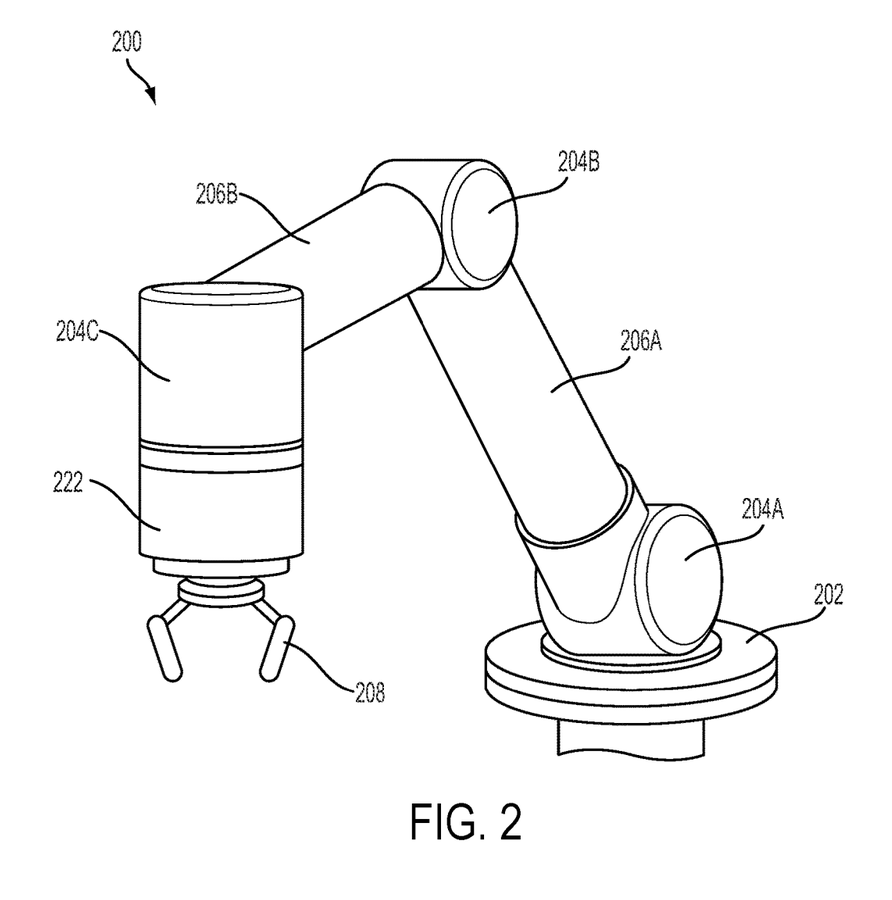
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204C each coupled to one or more of the actuator(s) 114. The actuators in joints 204A-204C may operate to cause movement of various movable component(s) 116 such as appendages 206A-206B and/or end effector 208. For example, the actuator in joint 204B may cause movement of appendage 206B and the actuator in joint 204C may cause movement of the end effector 208. Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

As illustrated in FIG. 2, the robotic arm 200 may also include a sensor housing 222. The sensor housing 222 is shown between joint 204C and the end effector 208, but may also be located between other components of robotic arm 200. The sensor housing 222 may include sensors, such as sensor(s) 110 from FIG. 1. The sensor housing 222 may also include mechanical and/or electrical components that are configured to receive inputs from other components of the robotic arm 200. In one example, the sensor housing 222 may include a flexure assembly with one or more strain gages configured to measure force/torque when a load is applied on some component of the robotic arm 200, such as on the end effector 208.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode).

Note, however, that external forces may also be applied by other entities in the physical workspace such as by other objects, machines, and/or robotic systems, among other possibilities.

III. EXAMPLE FLEXURE ASSEMBLIES FOR A FORCE/TORQUE SENSOR

Figure 3A:
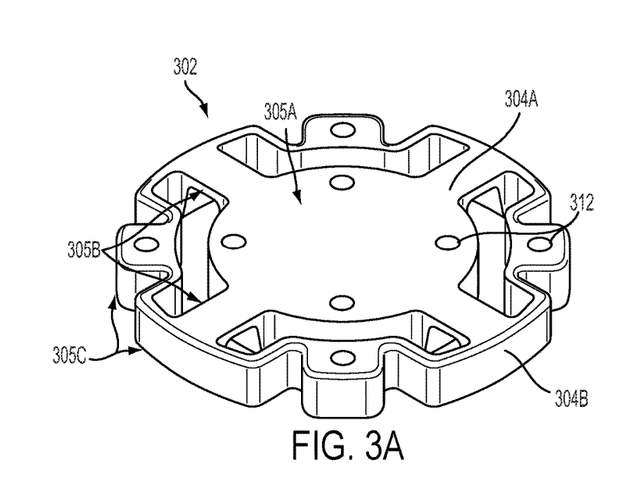
FIG. 3A illustrates an example flexural element of a flexure assembly, according to an example embodiment.
Figure 3B:
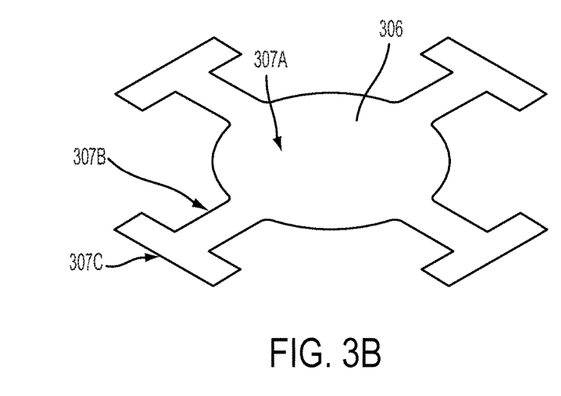
FIG. 3B illustrates an example carrier element of a flexure assembly, according to an example embodiment.
Figure 3C:
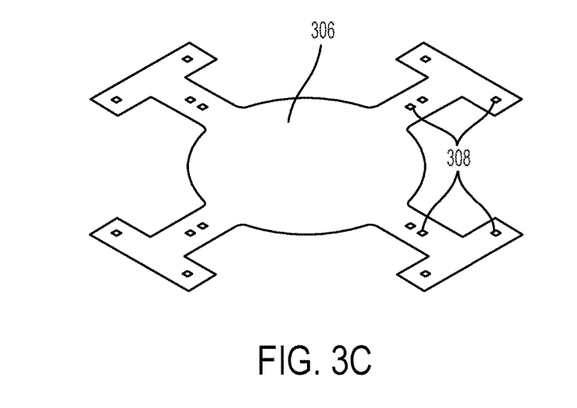
FIG. 3C illustrates an example carrier element with a plurality of strain gages of a flexure assembly, according to an example embodiment.
Figure 3D:
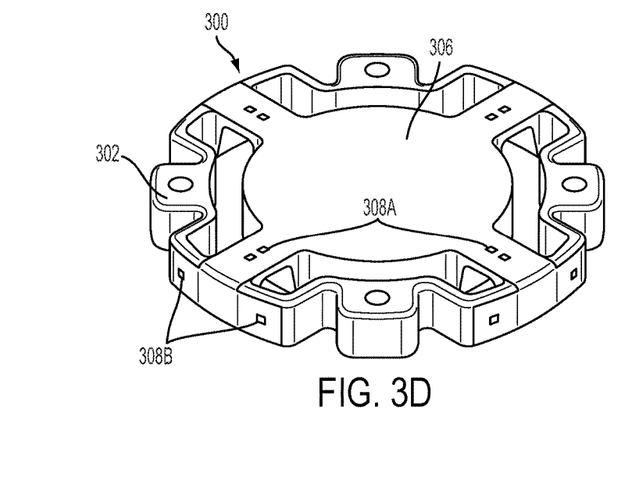
FIG. 3D illustrates an example flexure assembly, according to an example embodiment.

FIGS. 3A-3C illustrate different components of a flexure assembly 300: FIG. 3A illustrates just a flexural element 302, FIG. 3B illustrates just a bendable carrier element 306, and FIG. 3C illustrates the bendable carrier element 306 with a plurality of strain gages 308. FIG. 3D illustrates the flexure assembly 300 constructed, including the strain gages 308 attached to the bendable carrier element 306, and the bendable carrier element 306 bent around and attached to the flexural element 302. Within examples, the flexure assembly 300 may be located within a housing (not shown in FIGS. 3A-3D) as part of a robotic system, such as sensor housing 222 and robotic arm 200 as shown in FIG. 2.

As noted, FIG. 3A illustrates the flexural element 302. Within examples, the flexural element 302 is a flexible support structure that may be coupled to components but still allows bending, twisting or other motions between the connected components, or in other words a flexure bearing. In some aspects, a flexural element 302 may allow for relative motion between coupled components, but may also act like a spring in tending the coupled components towards a zero applied load resting state.

The flexural element 302 may include a plurality of surfaces 304A-B and at least one external connection point 312. The at least one external connection point 312 may be considered mounting points or locations to mount external components of a flexure assembly. In some examples, the flexural element 302 may be cylindrical in shape and may be constructed from aluminum. Within other examples, the flexural element 302 may take on any number of shapes with any number of geometries and be constructed from other materials such as steel or plastic. The flexural element 302 may be a six degree-of-freedom flexure because the flexural element 302 may be configured to flex, bend and/or move in any or all of six degrees-of-freedom. In at least one embodiment, the flexural element 302 may include a center component 305A, a plurality of beam components 305B, and an outer component 305C. Within examples, the center component 305A may be connected to the outer component 305C by the plurality of beams 305B.

The geometry or overall shape of the flexural element 302 may allow for tuning or control of the amount of bending or strain a load puts on the flexural element 302. For example, tuning the thickness of the plurality of beam components 305B may limit or increase the amount of bending or deflection of the outer component 305C relative to the center component 305A.

As illustrated in FIG. 3A, the plurality of surfaces 304A-B may include a planar surface 304A and a perimeter surface 304B. In at least one example, the planar surface 304A may be perpendicular to the perimeter surface 304B. In at least one embodiment, the planar surface 304A may include an outside surface of one flat side of the flexural element 302, and the perimeter surface 304B may include an outer cylindrical surface of a side of the flexural element 302. Within examples, the planar surface 304A may be formed by the center component 305A and the plurality of beams 305B, while the perimeter surface 304B may be formed from outward facing surface of the outer component 305C.

In some embodiments, the at least one external connection point 312 may be formed in a portion of the outer component 305C and a portion of the center component 305A of the flexural element 302. The at least one external connection point 312 may be configured to couple the flexural element 302 directly with other components of a robotic system, such as end effector 208 and/or joint 204C in FIG. 2. In another example, the at least one external connection point 312 may be configured to couple the flexural element 302 to a plurality of housing components, such as a first housing component and a second housing component. Within examples, the first housing component may be coupled to a first side of the flexural element 302 at external connection points 312 formed in the center component 305A, while the second housing component may be coupled to a second side of the flexural element at other external connection points 312 formed in the outer component 305C, and the second side of the flexural element 302 may be opposite of the first side. In yet other embodiments, other configurations of external connection points 312 may be possible. Further, the first and second housing components may be included as parts of the sensor housing 222 of FIG. 2.

As noted, FIG. 3B illustrates a bendable carrier element 306. Within examples, the bendable carrier element 306 is a single flexible planar substrate that may be shaped in order to conform to the plurality of surfaces 304A-B. For example, the bendable carrier element 306 may include a center component 307A, a plurality of beam components 307B and an outer component 307C that each correspond to at least part of the center component 305A, the plurality of beam components 305B and the outer component 305C of the flexural element 302. In one embodiment, the center component 307A and the plurality of beam components 307B may be the same (or approximately the same) size and shape as the planar surface 304A of the flexural element 302. Furthermore, the outer component 307C may be the same (or approximately the same) size and shape as at least a portion of the perimeter surface 304B of the flexural element 302. In some embodiments, the bendable carrier element 306 may include holes (not shown) that may correspond to and may align with external connections 312 formed in the center component 305A of the flexural element 302.

Within examples, the bendable carrier element 306 may be constructed from a thin metal foil or sheet. In some embodiments, the bendable carrier element 306 may be constructed from the same material as the flexural element 302. Further, in one example, the bendable carrier element 306 may include a flex circuit. Further still, in at least one example, the bendable carrier element 306 may be shaped such that the bendable carrier element 306 may be bent or folded around the flexural element 302 so that the bendable carrier element 306 may flex, bend and/or move in six degrees-of-freedom along with the flexural element 302.

As noted above, FIG. 3C illustrates the bendable carrier element 306 with the plurality of strain gages 308. The plurality of strain gages 308 may be attached to the bendable carrier element 306. In at least one embodiment, the plurality of strain gages 308 may be attached to the bendable carrier element 306 when the bendable carrier element 306 is flat, or for example, before the bendable carrier element 306 is bent around the flexural element 302. Further, the plurality of strain gages 308 may be attached to the bendable carrier element 306 with a screen printing process. In an additional example, the plurality of strain gages 308 may be distributed or spaced symmetrically about the bendable carrier element 306. As shown in FIG. 3C, at least some of the plurality of strain gages 308 may be attached on the outer component 307C while at least some other of the plurality of strain gages 308 may be attached on the plurality of beam components 307B of the carrier element 306.

Within examples, the plurality of strain gages 308 may be any type of strain gage including silicon, foil and/or thick-film gages. The plurality of strain gages 308 may include bonded metallic strain gages, which, for example, may include metallic foil or thin wire arranged in a pattern such that minor changes in electrical resistance may be measured and then used to calculate strain, as the electrical resistance may vary in proportion to the amount of strain. To measure the resistance, the plurality of strain gages 308 may be arranged in a half- or full-bridge configurations, or with precise orientation relative to one another (orthogonal, rosette, etc.) to provide multiaxial measurements that may compensate for temperature, or other purposes.

In addition to the plurality of strain gages 308, the bendable carrier element 306 may include a plurality of conductive traces and pads (not shown in FIGS. 3A-3D), and in at least one example, the conductive traces and pads may be installed or attached to a dielectric layer applied to the bendable carrier element 306. Within examples, the plurality of conductive traces and pads may be attached to the dielectric layer when the bendable carrier element 306 is flat. The plurality of conductive traces and pads may provide a plurality of electrical connections to the plurality of strain gages 308. In some embodiments, the plurality of conductive traces may be configured to be flexible or bendable and as such the plurality of conductive traces may bend with the bendable carrier element 306.

As noted above, FIG. 3D illustrates an embodiment of the flexure assembly 300 constructed, including the strain gages 308 attached to the bendable carrier element 306, and the bendable carrier element 306 bent around and attached to the flexural element 302. As shown in FIG. 3D, the plurality of strain gages 308 may be positioned along the plurality of surfaces 304A-B when the bendable carrier element 306 is bent around the flexural element 302. In at least one embodiment, the bendable carrier element 306 may conform for the plurality of surfaces 304A-B of the flexural element 302. In one example, the bendable carrier element 306 may be bent to conform the planar surface 304A and the perimeter surface 304B such that at least one of the plurality of strain gages 308A may be positioned along the planar surface 304A and at least one of the plurality of strain gages 308B may be positioned along the perimeter surface 304B.

Within examples, the plurality of surfaces 304A-B of the flexural element 302 may be positioned relative to each other such that when the bendable carrier element 306 is bent to conform to the plurality of surfaces 304A-B, as shown in FIG. 3D, the plurality of strain gages 308 may be oriented along the flexural element 302 in order to measure an applied load in six degrees-of-freedom. For example, as illustrated in FIG. 3D, the planar surface 304A and the perimeter surface 304B are on different planes such that the plurality of strain gages 308A and the plurality of strain gages 308B are then on different planes as well. If strain gages are only arranged on a single planar surface, those strain gages may exhibits relatively poor performance in measuring forces aligned with the planar surface and moments about an axis perpendicular to the planar surface when compared to an example embodiment in which at least one of the plurality of strain gages 308 is located on each of the plurality of surfaces 304A-B. In other words, for example, having at least one of the plurality of strain gages 308 on each of the plurality of surfaces 304A-B, where the plurality of surfaces 304A-B are within different planes, may provide for more sensitive and accurate measurement of strain in six degrees-of-freedom when compared another arrangement in which strain gages are only arranged within a single plane.

Within further examples, having the plurality of strain gages 308 closer to the flexural element 302 may result in more accurate strain measurements. In some embodiments, the plurality of strain gages 308 may be attached to an internal side of the bendable carrier element 306. The internal side of the bendable carrier element 306 is the side that is attached to the flexural element 302 and within such examples the plurality of strain gages 308 may be directly in contact with the flexural element 302 when the bendable carrier element 306 is bent to conform to the plurality of surfaces 304A-B of the flexural element 302. In some embodiments, having the plurality of strain gages 308 directly in contact with the flexural element 302 may result is more accurate strain measurements within the flexural element 302 because the plurality of strain gages 308 may stretch and deform more like the flexural element 302 when the plurality of strain gages 308 are in direct contact with the flexural element 302. Within other examples where the plurality of strain gages 308 are not in direct contact with the flexural element 302 the strain measured may be the strain of the bendable carrier 306 adhered or otherwise attached to the flexural element 302, and as such the strain measurements may not be as accurate.

Figure 4:
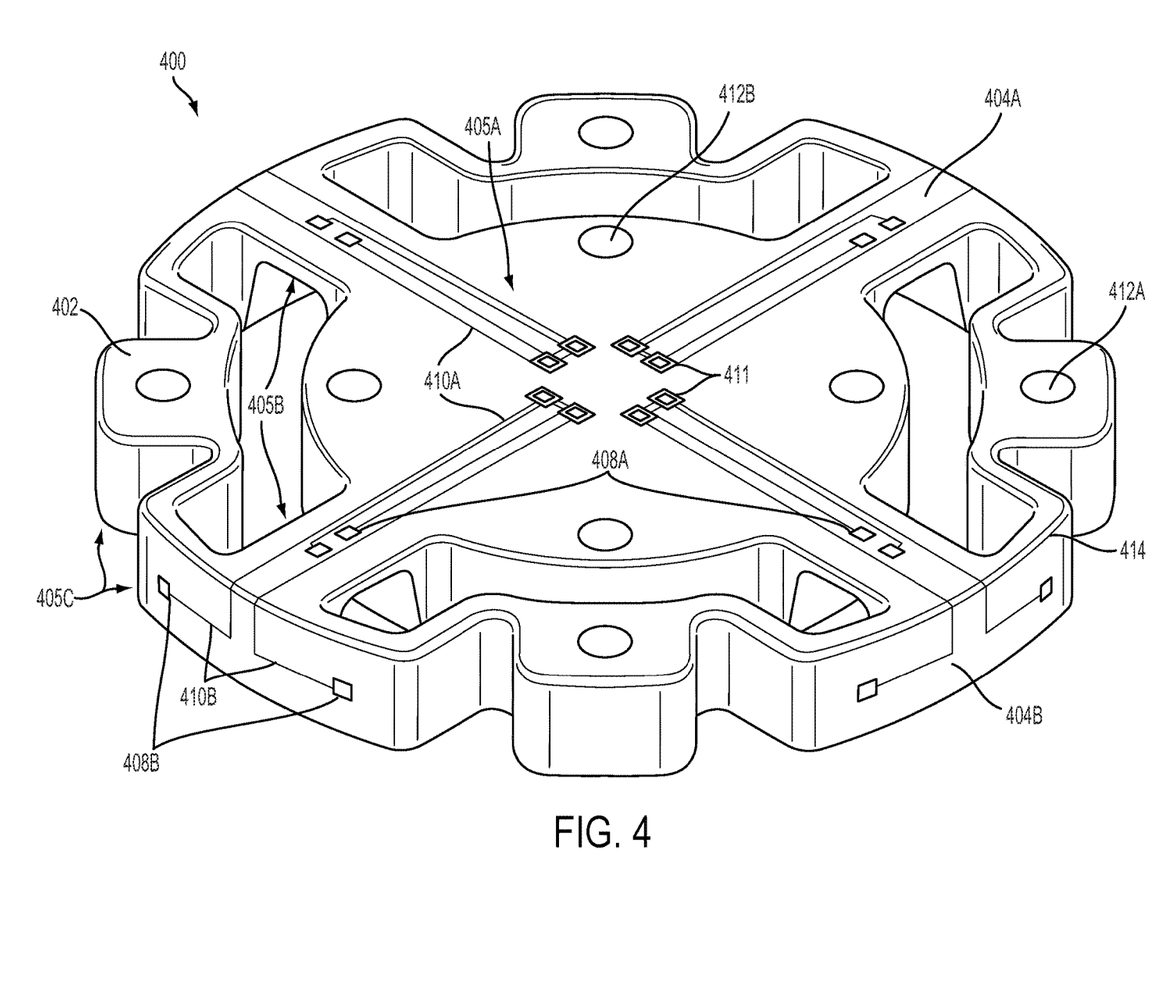
FIG. 4 illustrates another example flexure assembly, according to an example embodiment.

FIG. 4 illustrates another embodiment of a flexure assembly 400 for a force/torque sensor. Flexure assembly 400 may include a flexural element 402, a plurality of surfaces 404A-B, a center component 405A, a plurality of beam components 405B, and an outer component 405C, a plurality of strain gages 408A-B, a plurality of conductive traces 410, a plurality of conductive pads 411, and a plurality of external connection points 412A-B. Within examples, the flexural element 402 may include a planar surface 404A and a perimeter surface 404B. The planar surface 404A may include a top surface of the center component 405A and top surface(s) of the plurality of beam components 405B. The perimeter surface 404B may include at least a portion of an outward facing surface of the outer component 405C. In one example, the planar surface 404A may be perpendicular to the perimeter surface 404B. The flexural element 402, similar to the flexural element 302, may be configured to resist applied loads in six degrees-of-freedom.

A first plurality of strain gages 408A may be applied to the planar surface 404A of the flexural element 402 by utilizing a planar screen printing process. Within examples, the planar screen printing process is a push through process where a conductive metal ink (or emulsion), such as silver, is pushed through or forced through a fine screen or mesh and onto a planar substrate surface such that a pattern is created on the surface. In one embodiment, a printing screen is prepared by stretching a stainless steel wire mesh across a screen frame and attaching it, maintaining high tension of the mesh. An ink is then spread over the entire mesh, filling all open areas. A squeegee then moves the ink across the screen, a shearing action causes a decrease in viscosity, allowing the ink to pass through a designed pattern, onto the substrate. As the squeegee passes, the screen peels away and the ink viscosity recovers, leaving a print based on the pattern design. In one embodiment, the planar screen printing process for applying the first plurality of strain gages 408A may include forcing silver through a fine screen in a grid trace pattern onto the planar surface 404A for each of the first plurality of strain gages 408A.

A second plurality of strain gages 408B may be applied to the perimeter surface 404B of the flexural element 402 by utilizing a rotary screen printing process. Within examples, the rotary screen printing process is a push through process where a conductive metal ink, such as silver, is pushed through or forced through a fine screen and onto a cylindrical substrate surface such that a pattern is created on the surface. In one embodiment, the rotary screen printing process for applying the second plurality of strain gages 408B may include forcing silver through a fine screen in a grid trace pattern onto the perimeter surface 404B for each of the first plurality of strain gages 408A. Within other examples, non-cylindrical substrates may be used by modifying the rotary screen printing process to match the shape of the substrate surface the printing is to take place on.

Screen printing the first and second pluralities of strain gages 408A-B may allow for easy, quick and precise automatic placement and orientation of the first and second pluralities of strain gages 408A-B on multiple surfaces, such as the planar surface 404A and the perimeter surface 404B. Automating the process of applying the first and second pluralities of strain gages 408A-B by using planar and rotary screen printing, while maintaining a precise orientation of the pluralities strain gages 408A-B, may be important in order to produce force/torque flexure assemblies 400 in high-volume without compromising the sensitivity and accuracy of strain measurements.

Within examples, the flexure assembly 400 may further include a rounded outer edge 414 between the planar surface 404A and the perimeter surface 404B. In some embodiments, a plurality of perimeter conductive traces 410B may be electrically connected to the second plurality of strain gages 408B. The rounded outer edge 414 may be considered an outer edge that is at an end of a radius away from the center of the flexural element 402. The plurality of perimeter conductive traces 410B may be located on and applied to the perimeter surface 404B and the rounded outer edge 414 by rotary screen printing, similar to the application process of the second plurality of strain gages 408B described above.

Further, the flexure assembly 400 may include a plurality of planar conductive traces 410A that may provide electrical connections to the first plurality of strain gages 408A and to the plurality of perimeter conductive traces 410B. The plurality of planar conductive traces 410A may be located on applied to the planar surface 404A and the rounded outer edge 414 by a planar screen printing process, similar to the application process of the first plurality of strain gages 40A described above. In some embodiments, the plurality of perimeter conductive traces 410B may overlap at least one of the planar conductive traces 410A on the rounded outer edge 414 of the flexural element 402.

Within examples, a first end of the plurality of planar conductive traces 410A may be electrically attached to at least one of the first plurality of strain gages 408A or at least one of the plurality of perimeter conductive traces 410B, while a second end of the plurality of planar conductive traces 410A may be electrically attached to a plurality of conductive pads 411. The overlapping of the perimeter conductive traces 410B with the planar conductive traces 410A may facilitate the electrical connections between the second plurality of strain gages 408A and the plurality of conductive pads 411. The plurality of conductive pads 411 may allow for the transmission of electrical signals from the flexure assembly 400 to external system components, such as processor(s) 102 of the robotic system 100 in FIG. 1. The plurality of conductive pads 411 may be located near the center of the center component 405A for easy connections to external system components. In other embodiments, the plurality of conductive pads 411 may have a different configuration based on the design and configuration of the external components attached to the flexure assembly 400.

As such, the plurality of conductive traces 410 may be aligned to overlap on the rounded outer edge 414 thereby providing electrical connections between strain gages or elements on various surfaces without a need for subsequent wire-bonding or soldering processes to wire the various gages in the desired bridge configuration. Furthermore, within examples, this design may permit consolidating all of the plurality of connection pads 411 in a single location for simplified connection to external circuitry.

In some embodiments, planar and rotary screen printing processes may be used to develop thick-film-based piezoresistive strain gages for both the first plurality of strain gages 408A and the second plurality of strain gages 408B. While the flexural element 402 of FIG. 4 may be cylindrical in shape (i.e. the perimeter surface 404B may form a cylinder shape), other shapes are possible (e.g. slightly elliptical shape) while still utilizing a screen printing process. In further examples, the flexural element 402 may have a polygonal structure (e.g. 3 or more flat sides) and a screen printing process could be developed for that polygonal structure in order to print strain gages to perimeter faces of the flexural element 402. Within examples, planar and rotary screen printing processes, along with other modified screen printing processes based on the desired shape of the flexure assembly, may be used for a range of torque sensors beyond just a six degree-of-freedom sensor, such as single axis torque sensors.

As illustrated in FIG. 4, the flexure assembly 400 may include the plurality of external connection points 412. The plurality of external connection points 412 may allow a first housing component to be coupled to a first side of the flexural element 402 and a second housing component to be coupled to a second side of the flexural element 402. The first side of the flexural element 402 may be opposite of the second side of the flexural element 402. As shown in FIG. 4, some external connection points may be on the center component 405A while other external connection points may be on the outer component 405C. In at least one example, when a load is applied on a robotic system, such as the robotic arm 200 of FIG. 2, the forces and torques applied by the load may be transferred to the housing components such that the flexure assembly 400 experiences strains that can then be measured by the plurality of strain gages 408A-B.

Within examples, the flexure assembly 400 may include screen printing the first plurality of strain gages 408A on the planar surface 404A of the flexural element 402, screen printing the second plurality of strain gages 408B on the perimeter surface 404B of the flexural element 402, screen printing conductive traces 410B on the perimeter surface 404B, and screen printing conductive traces 410A and conductive pads 411 on the planar surface 404A.

Figure 5:
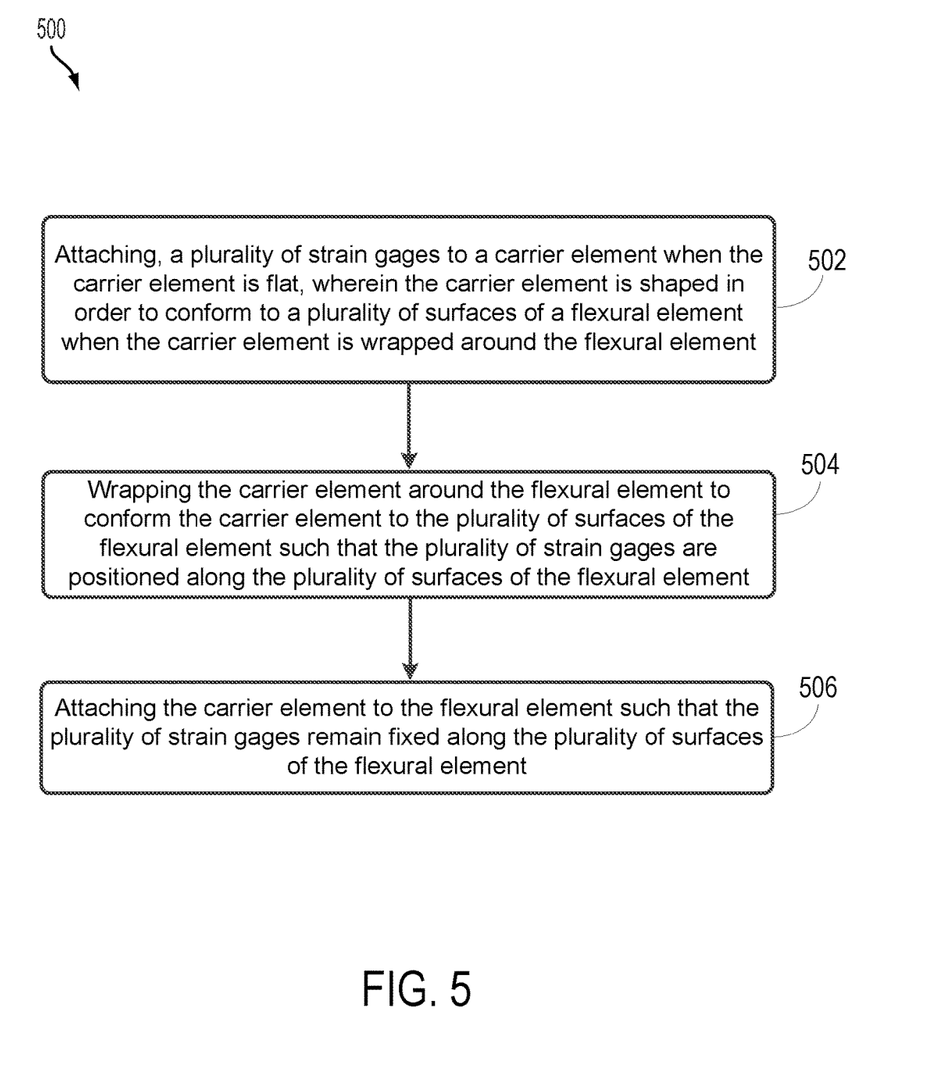
FIG. 5 is a block diagram of an example method, according to an example embodiment.

FIG. 5 is a flowchart of an example method for attaching strain gages to a carrier element and bending the carrier element around a plurality of surfaces of a flexural element to assembly a flexure assembly for a force/torque sensor in accordance with at least some embodiments described herein. In one example implementation, method 500 describes attaching a plurality of strain gages to a carrier element, bending the carrier element to conform to a plurality of surfaces of a flexural element, and attaching the carrier element to the flexural element.

Illustrative methods, such as method 500, may be carried out in whole or in part by a component(s) in a robotic system, such as one or more of the components in the robotic system 100 illustrated in FIG. 1, or by a component(s) in robotic arm 200 as illustrated in FIG. 2. It should be understood that example methods, such as method 500, might be carried out by entities, or combinations of entities (i.e., by other computing devices, robotic devices, and/or combinations thereof), without departing from the scope of the invention.

For example, functions of the method 500 may be fully performed by a computing device (or components of a computing device such as one or more processors or controllers), or may be distributed across multiple components of the computing device, across multiple computing devices, and/or across a server. In some examples, the computing device may receive information from sensors of the computing device, or may receive information from other computing devices that collect the information. As with other examples, a computing device, a server, or a robotic system may perform the method 500.

As shown by block 502, the method 500 includes attaching a plurality of strain gages to a carrier element when carrier element is flat. The carrier element may be a carrier foil or sheet constructed from a thin piece of metal. Within examples, the method 500 may include attaching conductive traces and/or pads to the carrier element when the carrier element is flat. The carrier element may be shaped in order to conform to a plurality of surfaces (for example, a planar and a perimeter surface) of a flexural element when the carrier element is wrapped around the flexural element.

The carrier element may be similar to other examples of carrier elements described within this application, such as bendable carrier element 306 of FIG. 3B. In at least one embodiment, the strain gages may be connected in a desired full- or half-bridge configuration in a single, quick and automated screen printing process. As such, within examples, the attachment or mounting of the plurality of strain gages to the carrier element when the carrier element is flat may leverage conventional automation in positioning, adhering and wiring the plurality of strain gages to the planar carrier element surface, possibly enabling large cost reductions and high volume production.

As shown by block 504, the method 500 includes wrapping the carrier element around the flexural element to conform the carrier element to the plurality of surfaces of the flexural element. Wrapping the carrier element around the flexural element may include aligning the carrier element with the flexural element and then bending at least a portion of the carrier element such that the carrier element conforms to the plurality of surfaces of the flexural element. This process may involve a machine that aligns the carrier element and then pushes on the carrier element to bend at least a portion of the carrier element to conform the carrier element to the flexural element.

Within examples, conforming the carrier element to the plurality of surfaces may position the plurality of strain gages along the plurality of surfaces of the flexural element. Positioning the strain gages on the plurality of surfaces of the flexural element may allow the flexure assembly to measure strain in six degrees-of-freedom. Furthermore, in at least one embodiment, method 500 may include matching alignment features on the carrier element and the flexural element in order to possibly permit easy fixturing when applying the plurality of strain gages to the carrier element, and also when applying the carrier element to the substrate flexural element.

As shown by block 506, the method 500 includes attaching the carrier element to the flexural element such that the plurality of strain gages remain fixed along the plurality of surfaces of the flexural element. Within examples, uniform pressure to support adhesion of the carrier element to the flexural element may be provided using a bladder or vacuum bag, or other methods.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

IV. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A device, comprising:
   a flexural element comprising a planar surface and a perimeter surface;
   a bendable carrier element that is shaped in order to conform to the planar surface and the perimeter surface of the flexural element when the carrier element is bent around the flexural element; and
   a plurality of strain gages attached to the carrier element when the carrier element is flat, wherein at least one of the plurality of strain gages is positioned along the planar surface and at least one of the plurality of strain gages is positioned along the perimeter surface of the flexural element when the carrier element is bent around the flexural element to conform to the planar surface and the perimeter surface of the flexural element and the carrier element is attached to the flexural element.

2. The device of claim 1, wherein the flexural element is cylindrical.

3. The device of claim 1, wherein the planar surface is perpendicular to the perimeter surface.

4. The device of claim 1, wherein the planar surface and the perimeter surface of the flexural element are positioned relative to each other such that when the carrier element is bent to conform to the planar surface and the perimeter surface, the plurality of strain gages are oriented along the flexural element to measure an applied load in six degrees-of-freedom.

5. The device of claim 1, further comprising:
   a dielectric layer applied to the carrier element; and
   a plurality of conductive traces and pads attached to the dielectric layer when the carrier element is flat, wherein the plurality of conductive traces and pads provide a plurality of electrical connections to the plurality of strain gages, and wherein the plurality of conductive traces are configured to bend with the carrier element.

6. The device of claim 1, wherein the plurality of strain gages are attached to the carrier element with a screen printing process.

7. The device of claim 1, wherein the carrier element comprises a flex circuit.

8. The device of claim 1, wherein the plurality of strain gages are attached to an internal side of the carrier element such that the plurality of strain gages become directly in contact with the flexural element when the carrier element is bent to conform to the planar surface and the perimeter surface of the flexural element.

9. The device of claim 1, wherein the plurality of strain gages are distributed symmetrically about the carrier element.

10. The device of claim 1, wherein the flexural element and the carrier element are the same material.

11. The device of claim 1, further comprising:
    a first housing component coupled to a first side of the flexural element; and
    a second housing component coupled to a second side of the flexural element, wherein the second side is opposite the first side of the flexural element.

12. A method, comprising:
    attaching a plurality of strain gages to a carrier element when the carrier element is flat, wherein the carrier element is shaped in order to conform to a plurality of surfaces of a flexural element when the carrier element is wrapped around the flexural element;
    attaching a dielectric layer on the carrier element when the carrier element is flat;
    attaching a plurality of conductive traces and pads to the carrier element when the carrier element is flat, wherein the plurality of conductive traces and pads provide a plurality of electrical connections to the plurality of strain gages, and wherein the plurality of conductive traces are configured to bend with the carrier element when the carrier element is wrapped around the flexural element;
    wrapping the carrier element around the flexural element to conform the carrier element to the plurality of surfaces of the flexural element such that the plurality of strain gages are positioned along the plurality of surfaces of the flexural element; and
    attaching the carrier element to the flexural element such that the plurality of strain gages remain fixed along the plurality of surfaces of the flexural element.

13. The method of claim 12, further comprising:
    attaching a planar section of the carrier element to a planar surface of the flexural element such that at least one of the plurality of strain gages is positioned along the planar surface of the flexural element;
    bending the carrier element to conform a perimeter section of the carrier element to a perimeter surface of the flexural element; and
    attaching the perimeter section of the carrier element to the perimeter surface of the flexural element such that at least one of the plurality of strain gages is positioned along the perimeter surface of the flexural element.

14. The method of claim 12, wherein attaching the plurality of strain gages to the carrier element comprises screen printing the plurality of strain gages on the carrier element.

15. The method of claim 12, wherein attaching the plurality of conductive traces and pads comprises screen printing the plurality of conductive traces and pads.

16. A device, comprising:
    a flexural element comprising a planar surface and a perimeter surface, wherein the planar surface is perpendicular to the perimeter surface, wherein the flexural element is configured to resist applied loads in six degrees-of-freedom;
    a first plurality of strain gages applied to the planar surface of the flexural element by planar screen printing; and
    a second plurality of strain gages applied to the perimeter surface of the flexural element by rotary screen printing.

17. The device of claim 16, wherein the flexural element further comprises a rounded edge between the planar surface and the perimeter surface, the device further comprising:
- a plurality of perimeter conductive traces electrically connected to the second plurality of strain gages, wherein the plurality of perimeter conductive traces are applied to the perimeter surface and the rounded edge by rotary screen printing; and
- a plurality of planar conductive traces that provide electrical connections to the first plurality of strain gages and to the plurality of perimeter conductive traces, wherein the plurality of planar conductive traces are applied to the planar surface and the rounded edge by planar screen printing such that the plurality of perimeter conductive traces overlap at least one of the planar conductive traces on the rounded edge of the flexural element.

18. The device of claim 12, wherein the first and the second plurality of strain gages comprise thick-film strain gages.

19. The device of claim 16, wherein the perimeter surface is in the shape of a cylinder.

20. The device of claim 16, further comprising:
- a first housing component coupled to a first side of the flexural element; and
- a second housing component coupled to a second side of the flexural element, wherein the second side is opposite the first side of the flexural element.

* * * * *